(12) United States Patent
Shul et al.

(10) Patent No.: US 6,432,577 B1
(45) Date of Patent: Aug. 13, 2002

(54) APPARATUS AND METHOD FOR FABRICATING A MICROBATTERY

(75) Inventors: Randy J. Shul; Stanley H. Kravitz; Todd R. Christenson, all of Albuquerque; Thomas E. Zipperian, Edgewood; David Ingersoll, Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 86 days.

(21) Appl. No.: 09/607,587

(22) Filed: Jun. 29, 2000

(51) Int. Cl.$^7$ ................................. H01M 6/12
(52) U.S. Cl. .................... 429/162; 429/218.1; 429/223; 429/247; 429/251; 429/252
(58) Field of Search .................. 429/162, 218.1, 429/223, 247, 251, 252

(56) References Cited

U.S. PATENT DOCUMENTS 4,087,905 A * 5/1978 Cooper et al. ............. 29/623.1
5,338,625 A   8/1994 Bates et al. ................ 429/193
5,501,893 A   3/1996 Laermer et al. ............ 428/161

OTHER PUBLICATIONS

Bates, et al, Rechargeable Thin–Film Lithium Batteries, 70/71; 619–628 (1994).
Bates, et al, Thin–Film Rechargeable Lithium Batteries, Journal of Power Sources, 58–62 (1995).
Bates, et al, IEEE AESS Systems Magazine, pp. 30–32 (Apr. 1995).
Solomon, et al, Proc. Solid–State Sensor and Actuator Workshop, pp. 338–341 (Jun. 1998).

* cited by examiner

Primary Examiner—Patrick Ryan
Assistant Examiner—Dah-Wei Yuan
(74) Attorney, Agent, or Firm—Kevin W. Bieg

(57) ABSTRACT

An apparatus and method for fabricating a microbattery that uses silicon as the structural component, packaging component, and semiconductor to reduce the weight, size, and cost of thin film battery technology is described. When combined with advanced semiconductor packaging techniques, such a silicon-based microbattery enables the fabrication of autonomous, highly functional, integrated microsystems having broad applicability.

15 Claims, 1 Drawing Sheet

APPARATUS AND METHOD FOR FABRICATING A MICROBATTERY

STATEMENT OF GOVERNMENT INTEREST

This invention was made with Government support under Contract DE-AC04-94AL85000 awarded by the U.S. Department of Energy. The Government has certain rights in the invention.

BACKGROUND OF THE INVENTION

The present invention is directed to an apparatus and method for fabricating a microbattery, and more particularly to a planar microbattery using silicon substrates as the structural foundation. With the use of advanced semiconductor packaging techniques, such a microbattery enables the fabrication of autonomous, highly functional, integrated Microsystems having broad applicability. Microsystems technologies seek to develop complex systems-on-a-chip that can sense, think, act, and communicate with their external environment without the need for external hardware. Past developments have emphasized microelectrical and micromechanical component technologies. However, to combine this functionality in an integrated microelectromechanical system (MEMS) requires a compatible power source, such as a microbattery, to power it as an autonomous unit.

Power and structure are areas where these integrated microsystems technologies can have significant impact. The power supply, consisting of energy conversion, energy storage and power management and distribution (PMAD), is an essential and enabling technology for these applications. Unfortunately, it is also often a limiting one, ultimately adding significant weight and volume to the structures. This shortcoming is exacerbated by the advance toward micro/ nano-structures since the relative proportion of inactive battery materials, such as the battery container, i.e. the structure to house it, increase significantly with size reduction. Similarly, the structural elements of the finished system/device, while necessary, make significant contributions to the final weight and volume, and the relative proportion of weight and volume of this inactive element will increase with size reductions.

Development of an Integrated Hybrid Power Structure (I-HPS) incorporating energy storage, energy conversion, PMAD, and structure, into a single integrated unit will lessen the impact that these individual components have on the final weight and size of the structure. The I-HPS will significantly reduce the overall size and weight of micro/ nano-structures. For example, thin structural frames, fabricated from silicon, may incorporate solar cells on one surface and PMAD elements on the opposing surface. Within the frames themselves, the energy storage element (e.g. lithium-ion batteries) will be accommodated to form a package providing structural and power capabilities.

Silicon (Si) is an ideal candidate for use as a structural foundation for autonomous, mesoscopic systems due to its high strength to density ratio of 3.0 Gpa/g/cc, an order-of-magnitude higher than titanium, aluminum, or stainless steel. Silicon also demonstrates favorable thermal, optical, and electrical properties and has well-defined microelectronic processing properties. Using Si substrates a structure that can simultaneously act as a structural element, a semiconductor substrate, an optical material, a package, a thermal management system, and a radiation shield can be realized.

This microbattery technology may be compared to thin film battery technology but differs due to its use of Si as a structural component, a packaging component, and as a semiconductor to reduce weight, size, and cost ("Rechargeable thin-film lithium batteries," Bates, et. al., *Solid State Ionics*, 70/71: 619–628 (1994); "Thin-film rechargeable lithium batteries," Bates et. al., *Journal of Power Sources*, 54: 58–62 (1995); "Thin-film Li—LiMn$_2$O$_4$ Batteries, " Bates, et al., *IEEE AESS Systems Magazine*, pp. 30–32 (April 1995)). In particular, previous thin-film microbatteries have not combined the use of Si wafers with advanced semiconductor packaging techniques so as to enable a highly functional integrated MEMS unit ("Development of Rechargeable Microbatteries for Autonomous MEMS Applications," Salmon, et. al., *Proc. Solid-State Sensor and Actuator Workshop*, pp. 338–341 (June 1998)). Preferably, microbattery fabrication leverages silicon technologies made in semiconductor processing over the past decade. Use of silicon technologies and the packaging techniques enabled thereby will decrease the cost and increase the functionality of integrated MEMS devices. In particular, resent development of several semiconductor fabrication processes has allowed the use of silicon substrates as structural foundation for autonomous, mesoscopic systems.

Perhaps the most important development has been a deep reactive ion etch (DRIE) process which has revolutionized the concept and implementation of mixed technology integration ("Method of Anisotrpically Etching Silicon," Laermer, et. al., U.S. Pat. No. 5,501,893). Using the DRIE process, a Si substrate can be etched to specific depths with highly controlled lateral dimensions. This allows accurate alignment of dissimilar components and materials to one another and accurate wafer-to-wafer alignment. Utilizing on-chip microelectronic and mechanical structures, this technology will enable fabrication of a self-contained, highly versatile, integrated microsystem that will minimize volume, weight, and power requirements. DRIE also enables the pursuit of a collection of advanced packaging capabilities to address the need for complex microsystems that combine multiple materials and functions in a single package or assembly.

SUMMARY OF THE INVENTION

In one embodiment, a set of four Si wafers is used to form the planar microbattery structure. The two exterior Si wafers or frames are used to enclose and seal the anode and cathode of the microbattery while providing support for external circuitry. For example, on one Si frame, power management circuitry that is either pre-fabricated on the wafer, or attached as a hybrid, can be precisely located. The other exterior Si frame can be used to support photovoltaic cells that can be used as a power source for the microbattery. Through-frame plated vias can also be fabricated into the Si frame structures to provide electrical contact from the external circuitry to the anode and cathode. The interior Si wafers are patterned using DRIE in a honeycomb cell structure for placement of the anodic and cathodic battery materials. A patterned insulating layer overlaid by an electronic conductor can be placed onto the Si frames as one option for current collection. A dielectric porous membrane is located between the anode and cathode layers to prevent contact of the solid battery materials but allow the flow of the electrolyte material between electrodes as well as possibly providing continuous mechanical support throughout the structure. The silicon frames and interior electrodes are accurately aligned using alignment wells and pins. Bonding of the silicon frames can be used to form a hermetically sealed structure.

BRIEF DESCRIPTION OF THE DRAWINGS

The accompanying drawing, which is incorporated in and forms part of the specification, illustrates the present invention and, together with the description, explains the invention. In the drawing, like elements are referred to by like numbers.

DETAILED DESCRIPTION OF THE INVENTION

Figure 1:
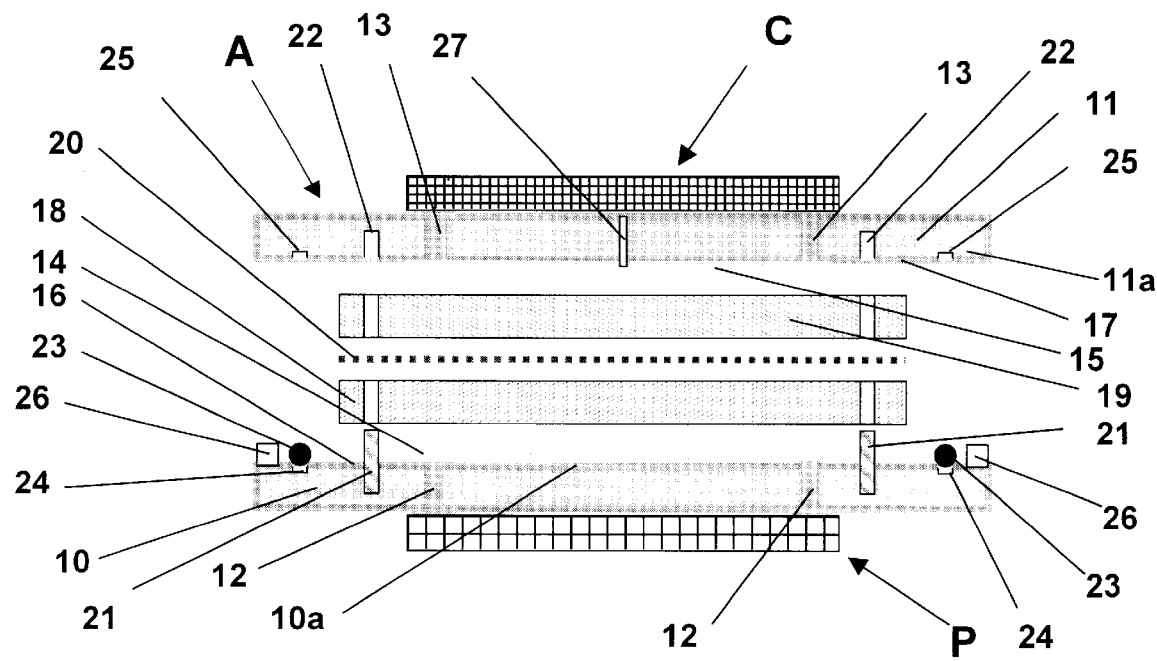
FIG. 1 shows a partially exploded schematic diagram of a planar microbattery according to the present invention.

One embodiment of the present invention is shown schematically in FIG. 1. More particularly, a first frame 10 and a second frame 11 form the external, structural elements of the microbattery A. Additionally, the frames 10, 11 seal and enclose the internal elements of the microbattery A and provide support for a variety of external circuitry, all of which will be further discussed below. The use of silicon for frames 10, 11 is highly desirable because of its high strength to density ratio. Silicon also provides favorable thermal, optical, and electrical properties and enables the use of well-developed microelectronics processing. Nevertheless, those skilled in the art will appreciate that other structural materials, such as Pyrex, can be used for frames 10, 11. Preferably, the frame material also possesses the optical, thermal, and electrical properties to enable an integrated microbattery supporting multiple functionality.

Each frame 10, 11 includes a pair of through-frame plated vias 12, 13 to provide electrical connection between external circuitry, such as power management circuitry P or photovoltaic cell C, and internal current collectors 14, 15. If the frames 10, 11 are conducting or semiconducting, they can be electrically separated from current collectors 14, 15 by dielectric layers 16, 17 formed on the interior surfaces 10$a$, 11$a$ of the frames 10, 11, respectively.

When the frames 10, 11 are Si, the plated vias 12, 13 are fabricated using the Si DRIE process to form the through-frame via holes, steam oxidation to isolate the metal via plugs from the frames 10, 11, and electroplating to form the metal plugs. Typically, 100 $\mu$m wide vias 12, 13 are formed in approximately 425 $\mu$m thick frames 10, 11 using the DRIE process.

Steam oxidation of the silicon frames 10, 11 can completely isolate vias 12, 13 by growing the oxide in place, rather than depositing films onto exposed surfaces. For high aspect ratio (>1:1) vias, neither low-pressure not plasma-enhanced chemical vapor deposition processes will adequately isolate the via, as the deposited insulating film thickness deceases with the depth into the via. Because only water and oxygen molecules need to enter the via while hydrogen is the only reaction product, the oxide grown in the vias by steam oxidation is uniform throughout the entire depth. At one atmosphere pressure the practical limit for oxide growth is about 2 $\mu$M at 1200° C. In high pressure (25 atmospheres) oxidation systems, it is possible to grow thicker films in shorter times or to oxidize at temperatures as low as 500° C. The breakdown voltage for steam oxidized films is about 100 volts per $\mu$m film thickness. Simultaneously, steam oxidation of the interior surfaces 10$a$, 11$a$ of the Si frames 10, 11 to form dielectric oxide layers 16, 17 also prevents electrical contact between the Si frames 10, 11 and the interior current collectors 14, 15.

Following oxidation, the vias 12, 13 are electroplated using the following process. A copper substrate is coated with polymethylmethacrylate (PMMA) photoresist and solvent bonded to the Si frame. The PMMA is removed in the via locations with a deep ultraviolet (DUV) blanket exposure and development cycle using the oxidized silicon frame as a stencil mask. The vias are then electroformed using an electrolytic nickel deposition. Finally, the copper plating fixture is completely removed in a simple wet etch process. A similar fabrication sequence for copper and gold vias is also possible, as well as for nickel-iron (Permalloy) to allow the incorporation of through wafer magnetic flux paths.

Following fabrication of the frames 10, 11, a current collector layer 14, such as copper, nickel, carbon, or silver, can be deposited on the dielectric layer 16 of Si frame 10 to provide efficient electrical contact of a cathode layer 18 with the via 12.

The cathode layer 18 is fabricated by patterning a honeycomb cell structure through a Si wafer using the DRIE process. 400 $\mu$m is a typical etch depth. Such a honeycomb structure minimizes weight, maintains structural integrity, and establishes storage capacity for a cathodic battery material. Depending on the battery material and electrolyte selected, it may be necessary to protect the Si honeycomb with a passivating film, such as silicon nitride or silicon dioxide. The cathode layer 18 is mounted on the current collector 14 such that the cathodic battery material contacts the current collector 14.

A dielectric porous membrane layer 20 is mounted on the cathode layer 18 on the side opposite the current collector 14 to electrically isolate the cathode layer 18 from an anode layer 19, and yet allow electrolyte to pass through and transfer ions. A silicon nitride film with 1 $\mu$m holes on 2 $\mu$m centers provides such a porous membrane 20, Similarly, the anode layer 19 is fabricated by patterning a honeycomb cell through a second Si wafer using the DRIE process for placement of the anodic battery material. The anode layer 19 is mounted on the porous membrane layer 20 so as to be electrically isolated from the cathode layer 18 and the first frame 10. A second frame 11, including an insulating dielectric layer 17, current collector layer 15, and through-frame plated vias 13 for connection of the external anode conductive leads and the anode is fabricated, using the above described process, and mounted on the anode layer 19.

Suitable anodic/cathodic electrochemical couples include nickel/zinc, silver/zinc, lithium/MnO$_2$, and nicad. Typically, the battery materials have a void volume of about 50% to allow for incorporation of the electrolyte.

The frames 10, 11 are aligned and hermetically seated, which allows the frames 10, 11 to also serve as a packaging medium for the microbattery A. Using the DRIE process, accurate alignment of frames 10, 11 as well as precision die-to-wafer alignment can be achieved for advanced packaging technologies. A Si substrate can be etched to multiple, specific depths while retaining accurately controlled dimensions in the mask plane. This permits accurate alignment of discrete components to one another with alignment tolerances <5 $\mu$m. For example, 130 $\mu$m wide pins 21 are DRIE etched in the Si frame 10 while 132 $\mu$m wide wells are DRIE etched in the opposing Si fame 11. The pins 21 and wells 22 are aligned and then attached using a UV curing adhesive to tolerances of <5 $\mu$m on ~10 cm$^2$ frames. Using a slightly different pattern, pieces as large as ¼ of a 3 inch Si wafer have been aligned to tolerances of ~25 $\mu$m. FIG. 1 shows the alignment of a plurality of non-conductive alignment pins 21 in the first frame 10, through the electrodes 18, 19 and porous membrane 20, with a plurality of alignment wells 22 in the second frame 11.

Frames 10, 11 can be bonded together using a number of different techniques. Bonding techniques include: direct wafer fusion, anodic bonding, fit glass bonding, solder bonding, and adhesive bonding. Commercially available wafer alignment/bonding systems are available with alignment accuracies of ±2 μm. These machines can heat to 600° C., and apply programmed pressure, and voltage for anodic bonding. They can also provide a controlled atmosphere or vacuum during the bonding process.

In direct wafer fusion, frames 10, 11 are aligned and bonded at 600° C. with no additional material. The lightly bonded frames 10, 11 are then transferred to a high temperature furnace where bonding is completed at >1000° C. Anodic bonding relies on the formation of an oxide grown on silicon at the interface with Pyrex glass. A high voltage is applied to the wafer, which causes the alkali metal ions in the Pyrex to migrate to the cathode. An oxide is formed at the silicon interface from the applied field if the oxygen is present at about 300° C. Two silicon wafers can also be joined by this technique if Pyrex is sputter deposited on one of the wafers. Frit glass bonding uses a screened film of low melting temperature glass to seal the wafers directly. In solder bonding, the solder preforms or pastes can be applied to either wafer surface. Sol-gel systems can also be used to bond the layers through formation of an oxide network that is covalently bound to the surface oxide film formed on the silicon wafer.

Adhesive bonding is similar to solder bonding, but adhesives alone do not make hermetic seals. In FIG. 1, an o-ring 23 is positioned in groove 24 in frame 10 for mating with groove 25 in frame 11. The silicon frames 10, 11 are bonded together with epoxy adhesive 26 to make the hermetic seal.

The electrolyte is selected to meet the electrochemical requirements of the anodic/cathodic battery couple and chemical compatibility requirements of the microbattery structural materials. Aqueous KOH is a suitable electrolyte for a nickel/zinc couple. Since KOH will attack silicon and silicon dioxide, it is necessary to protect the honeycomb cell structure of the interior electrodes 18, 19 with a passivation film of, for example, silicon nitride. When the battery electrolyte is a liquid, it can be introduced into porous battery material contained in the honeycomb cell structure of the interior electrodes 18, 19 through an electrolyte fill hole 27 in Si frame 11. One method to accomplish the filling is to place the microbattery A under vacuum to evacuate the battery material void volume and subsequently back fill the pores with the liquid electrolyte. During operation of the microbattery A, the electrolyte can pass through the porous membrane 20 to transfer ions between the cathode 18 and anode 19.

What is claimed is:

1. A microbattery, comprising:
   a) a dielectric porous membrane;
   b) a first electrode containing anodic material mounted on one side of the porous membrane;
   c) a second electrode containing cathodic material mounted on the opposite side of the porous membrane;
   d) a first silicon frame mounted with the first electrode and on the side opposite the porous membrane;
   e) a second silicon frame mounted with the second electrode and on the side opposite the porous membrane; and
   f) electrical connectors passing through each frame for providing electrical connectivity from the first and second electrodes to external circuitry.

2. The microbattery of claim 1, further comprising a first dielectric layer on the side of the first silicon frame facing the porous membrane and a second dielectric layer on the side of the second silicon frame facing the porous membrane.

3. The microbattery of claim 2, wherein the first and second dielectric layers comprise silicon dioxide or silicon nitride.

4. The microbattery of claim 2, further comprising a first current collector layer on the side of the first dielectric layer facing the porous membrane and a second current collector layer on the side of the second dielectric layer facing the porous membrane, and wherein the electric connectors make electrical connectivity from the first and second current collector layers to external circuitry.

5. The microbattery of claim 4, wherein the first and second current collector layers comprise aluminum, copper, nickel, carbon, or silver.

6. A microbattery, comprising:
   a) a dielectric porous membrane;
   b) a first electrode containing anodic material mounted on one side of the porous membrane;
   c) a second electrode containing cathodic material mounted on the opposite side of the porous membrane;
   d) a first frame mounted with the first electrode and on the side opposite the porous membrane, and wherein the first frame is conducting or semiconducting;
   e) a first dielectric layer on the side of the first frame facing the porous membrane; and
   f) a second frame mounted with the second electrode and on the side opposite the porous membrane, and wherein the second frame is conducting or semiconducting;
   g) a second dielectric layer on the side of the second frame facing the porous membrane; and
   h) electrical connectors passing through each frame for providing electrical connectivity from the first and second electrodes to external circuitry.

7. The microbattery of claim 6, wherein the first and second dielectric layers comprise silicon dioxide or silicon nitride.

8. The microbattery of claim 7, wherein the first and second dielectric layers are made by steam oxidation of silicon.

9. The microbattery of claim 6, further comprising a first current collector layer on the side of the first dielectric layer facing the porous membrane and a second current collector layer on the side of the second dielectric layer facing the porous membrane, and wherein the electric connectors make electrical connectivity from the first and second current collector layers to external circuitry.

10. The microbattery of claim 9, wherein the first and second current collector layers comprise aluminum, copper, nickel, carbon, or silver.

11. A microbattery, comprising:
    a) a dielectric porous membrane;
    b) a first electrode comprising a honeycomb cell structure in silicon containing anodic material mounted on one side of the porous membrane;
    c) a second electrode comprising a honeycomb cell structure in silicon containing cathodic material mounted on the opposite side of the porous membrane;
    d) a first frame mounted with the first electrode and on the side opposite the porous membrane;
    e) a second frame mounted with the second electrode and on the side opposite the porous membrane; and
    f) electrical connectors passing through each frame for providing electrical connectivity from the first and second electrodes to external circuitry.

12. The microbattery of claim 11, wherein the honeycomb structure is patterned into silicon using a deep reactive ion etching process.

13. A microbattery, comprising:
   a) a dielectric porous membrane;
   b) a first electrode containing anodic material mounted on one side of the porous membrane;
   c) a second electrode containing cathodic material mounted on the opposite side of the porous membrane;
   d) a first frame mounted with the first electrode and on the side opposite the porous membrane;
   e) a second frame mounted with the second electrode and on the side opposite the porous membrane; and
   f) electrical connectors comprising a plurality of through-frame plated vias passing through each frame for providing electrical connectivity from the first and second electrodes to external circuitry.

14. The microbattery of claim 13, wherein the through-frame plated vias are fabricated by forming through-frame via holes by deep reactive ion etching in silicon, steam oxidation of the via holes, and electroplating to form metal via plugs that are electrically isolated from the frames.

15. The microbattery of claim 14, wherein the metal via plugs are gold, nickel, copper, or nickel-iron.

* * * * *